United States Patent [19]

Myers et al.

[11] Patent Number: 5,035,929

[45] Date of Patent: Jul. 30, 1991

[54] THREE DIMENSIONAL PICTURE

[75] Inventors: Mark Myers, Ft. Lauderdale; Sandy Levy, Miami, both of Fla.

[73] Assignee: Dimensional Images, Inc., Boca Raton, Fla.

[21] Appl. No.: 365,316

[22] Filed: Jun. 13, 1989

[51] Int. Cl.[5] ........................... B32B 3/30; B32B 7/00

[52] U.S. Cl. ........................................ 428/30; 40/454

[58] Field of Search ......................... 40/592, 596, 454; 428/13, 30

[56] References Cited

U.S. PATENT DOCUMENTS

| | | | |
|---|---|---|---|
| 2,499,453 | 3/1950 | Bonnett | 428/30 X |
| 3,462,226 | 8/1969 | Huffaker | 430/22 X |
| 4,420,527 | 12/1983 | Conley | 428/30 X |
| 4,478,639 | 10/1984 | Smith et al. | 428/195 X |
| 4,481,050 | 11/1984 | Gundlach et al. | 428/30 X |

OTHER PUBLICATIONS

Stereoscopy by Direct Vision Chapter XVII. Vannostrand Reinhold Co.-New York, Cicinnati, Toronto, London Melbourne Fundations of the Stereoscopic Cinema, Copyright 1982 pp. 68-75.

Product Brochure for Wt 102 Camera.

Article Entitled "The Big Sleep" pp. 155-157 3-D Since 1955.

Article Entitled "Nimslo in the News" Pron Reel 3-D News May-Jun. 1980 vol. III; No. 5, pp. 7 & 8.

*Primary Examiner*—Henry F. Epstein
*Attorney, Agent, or Firm*—Robert C. Kain, Jr.

[57] ABSTRACT

The three-dimensional picture includes a transparent substrate carrying, on a top surface, periodically spaced, non-transparent lines of a predetermined width and carrying, on a bottom surface, an underlying picture formed by a lenticular process. The underlying picture has a plurality of lenticular planes and the non-transaprent lines are positioned substantially parallel to the lenticular planes. The underlying picture could have a multiplicity of vertically spaced, multiple images of an object. If the three dimensional picture is translucent to light, it can be mounted on a light box. When the substrate is flexible, the three dimensional picture can be incorporated into magazines or other promotional materials.

14 Claims, 1 Drawing Sheet

THREE DIMENSIONAL PICTURE

BACKGROUND OF THE INVENTION

The present invention relates to a three dimensional picture.

One current method of producing a three dimensional picture involves utilizing a lenticular lens that modifies the image radiating from a specially processed picture. The lenticular lens is a planar lens having a plurality of vertically extending minute lenses. The lenticular lens is typically die cast and, therefore, it is difficult and costly to produce three dimensional pictures having different sizes since the lenticular lens must be uniquely developed and cast for that size picture. Also, although the underlying lenticular picture can be blown up, there are inherent errors involved in blowing up such pictures. For example, if the lenticular picture was to be enlarged 100%, there is typically plus or minus 3-4% error in the enlarged picture. When a large lenticular lens is made for that picture, the margin of error is different. When the lens is placed over the lenticular picture, the resultant three dimensional image is inferior. Therefore, problems currently exist in using lenticular pictures mounted below lenticular lenses in that for different sized pictures, a unique lenticular lens die must be produced and the lens cast, all with inherent errors introduced therein. When the film is blown up, there are errors in the enlargement that result in poor quality three dimensional photographs; and when the errors in the photographs are combined with the die cast errors of the larger lenticular lens, the resulting composite, three dimensional structure picture is not acceptable for commercial applications.

OBJECTS OF THE INVENTION

It is an object of the present invention to provide a three dimensional picture wherein the errors involved in enlarging the underlying lenticular photograph are carried forward to the same degree to the overlying interference lens due to the optical characteristics of the interference lens.

It is another object of the present invention to provide a three dimensional picture that is highly flexible and pliable and does not require a lenticular lens.

SUMMARY OF THE INVENTION

The three dimensional picture includes a transparent substrate carrying, on a top surface, periodically spaced, non-transparent lines of a predetermined width and carrying, on a bottom surface, an underlying picture formed by a lenticular process. The underlying picture has a plurality of lenticular planes and the non-transparent lines are positioned substantially parallel to the lenticular planes. The underlying picture could have a multiplicity of vertically spaced, multiple images of an object. If the three dimensional picture is translucent to light, it can be mounted on a light box. When the substrate is flexible, the three dimensional picture can be incorporated into magazines or other promotional materials.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENT

The present invention relates to a three dimensional picture.

Figure 1:
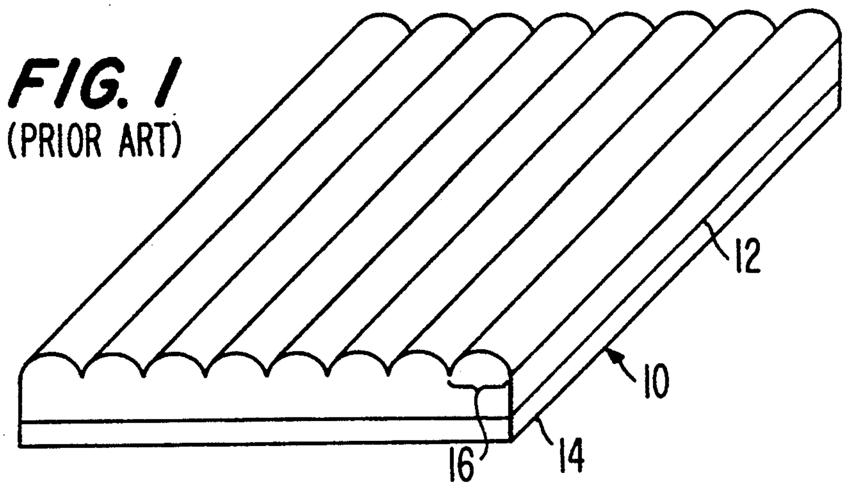
FIG. 1 (PRIOR ART)
FIG. 1 illustrates a perspective view of the prior art showing a lenticular lens mounted above a lenticular picture or a picture having a multiplicity of vertically spaced, multiple images.

FIG. 1 is a perspective view of a prior art, three dimensional composite picture 10. Composite picture 10 includes a lenticular lens 12 mounted on top of an underlying picture formed by a lenticular process 14. Lenticular lens 12 is made of a plurality of individual lenses, one of which is lens 16. Composite picture 10 includes approximately 100 lenses per inch of picture width. Essentially, the image passing through lenticular lens 12 is magnified and refracted according to the viewing plane. Typically, lenticular lens 12 is die cast and, therefore, it is difficult to utilize different sizes of underlying pictures 14 since each lenticular lens 12 must be die cast for each size underlying picture. In addition, lenticular lens 12 is substantially rigid. Lenticular lens 12 may be differently shaped. However, the optical characteristics of the lenticular lens are essentially similar. These characteristics are known in the art.

Figure 2:
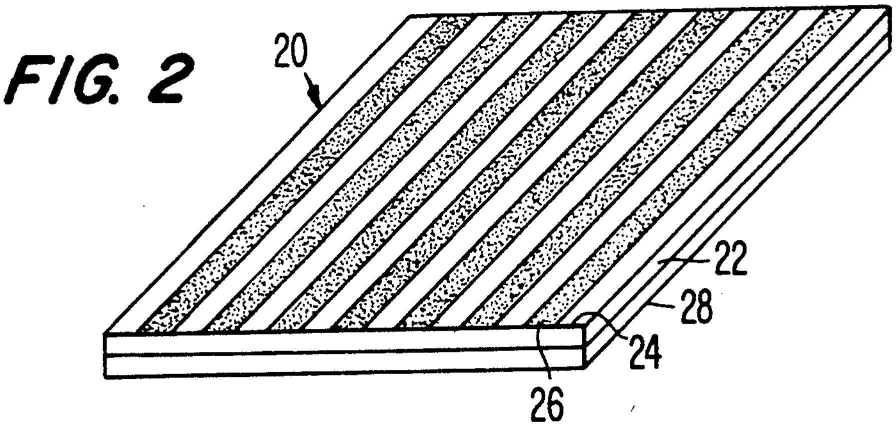
FIG. 2 illustrates a perspective view of a three dimensional picture in accordance with the principles of the present invention.

FIG. 2 illustrates a perspective view of composite, three dimensional picture 20 constructed in accordance with the principles of the present invention. Composite, three dimensional picture 20 includes a transparent substrate 22 that carries, on top surface 24, a plurality of periodically spaced, non-transparent lines, one of which is line 26. Each non-transparent line has a predetermined width. Each line has the same width and is spaced the same distance apart from the next line. Transparent substrate 22 could be plastic such as acetate. Lines 26 preferably are non-transparent, printed material placed on the substrate. The lines may also be frosted portions of the acetate. Otherwise, lines 26 could be printed onto transparent substrate 22. The thicker or greater the width of the lines, the less light would pass through composite picture 20 and the composite picture would look darker. One of the benefits of using a transparent substrate is that the substrate could be as thick as 20 mils, but is preferably about 15 mils, and still the composite structure is flexible and pliable.

Transparent substrate 22 carries on its bottom surface an underlying picture 28. In one embodiment, underlying picture 28 is formed by a lenticular process. These types of pictures are known in the art.

Figure 3:
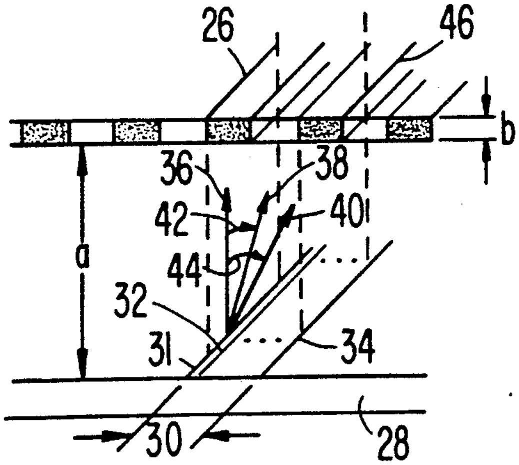
FIG. 3 illustrates an enlarged, schematic view of the three dimensional picture system.

FIG. 3 diagrammatically illustrates one of the principles of the present invention. Underlying picture 28 is shown and the transparent substrate 22 has a thickness equal to distance a. The non-transparent lines printed on the top surface of substrate 22 are shown having a thickness b. In one embodiment, picture 28 is formed by a multi-dimensional camera WT-100. This camera has a single, rectangularly shaped lens. The shutter moves transversely right to left across the lens. Simultaneously and synchronously, the film plane moves transversely left to right. This results in a picture having a multiplicity of vertically spaced, multiple images of the object. It is believed that other types of cameras are capable of taking multi-dimensional pictures, such as a Nimslo camera. In any event, FIG. 3 diagrammatically shows such a picture consisting of a sequence of multiple images. Sequence 30 consists of sequential, multiple images, such as 31, 32 of an object. The next sequence begins with the first part of the sequence 34. Therefore, the image along vertical plane 31 is similar to the image along vertical plane 34 since image 31 is in a first in a series and image 34 is a first in the next series. Light rays 36, 38 and 40 emanate from image 31. These light rays are angularly disposed, for explanation purposes at 90 with respect to a plane normal to the planar surface of the composite picture (light ray 36), and approximately 15° (angle 42) off the normal (light ray 38) and approximately 30° (angle 44) off the normal (light ray 40).

Non-transparent line 26 has a thickness b and to a person viewing the composite picture at 90°, light ray 36 would be blocked. If the person moved slightly off the normal, the person would see light ray 38 and possibly ray 40. Therefore, by having the observer move, the three dimensional picture becomes apparent. Underlying picture 28 could be a picture formed by a lenticular process which is similar to sequential, multiple images produced by the WT-100 multi-dimensional camera or a Nimslo camera. With all these multi-dimensional pictures, the pictures have vertical planes that are normal to the plane of the picture wherein the image is substantially similar. These planes are called herein lenticular planes. These underlying pictures produce three dimensional images in either the prior art (FIG. 1) or the present invention (FIGS. 2–3). In the prior art, the lenticular lens would have to be in registry with the lenticular planes in the photograph attached below the lens. A similar requirement is present for the instant invention in that transparent substrate 22, having non-transparent lines 26 on the top thereof is an interference lens, and the non-transparent lines must be substantially aligned over similar sequential ones in the series of the underlying pictures. Therefore, the left end surface of line 26 in FIG. 3 is substantially coplanar, or in a plane normal to the plane of the substrate, to sequential image 31 of the serial image 30. The next non-transparent line 46 has a left edge that is coplanar or in a plane normal to the plane of the substrate with sequence 34 of the series that is immediately to the right of series 30.

One of the benefits of having a transparent substrate which carries non-transparent lines is that the multiple image underlying picture 28 can be blown up, for example, 100% with 3–4% error. In order to enlarge the interfering lines, the same enlarging mechanism is utilized and, hence, the errors are the same when blowing up the underlying picture 28 when compared with manufacturing the negative to print the non-transparent lines on transparent substrate 22. Further, the transparent substrate 22 can be flexible and pliable and the composite, three dimensional picture 20 can be utilized in a wide variety of promotional and commercial uses, such as magazines, brochures, etc. In the prior art, wide commercialization of a lenticular lens three dimensional picture was not possible since the lens is rigid. Preferably, one way to manufacture the composite, three dimensional picture 20 is to laminate underlying picture 28 to the back of the flexible plastic. The non-transparent lines are printed on the top surface of the plastic.

Figure 4:
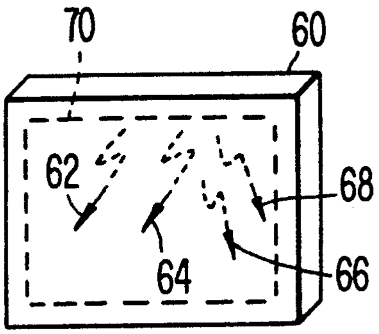
FIG. 4 illustrates a perspective view of a light box with the three dimensional picture.

When composite, three dimensional picture 20 is substantially transparent, in that underlying picture 28 is, for example, a slide, the underlying picture 28 is considered translucent to light. When the composite, three dimensional picture is mounted in a light box 60, as shown in FIG. 4, light rays 62, 64, 66 and 68 emanating from a light source 70 provide a three dimensional picture.

One of the benefits of the present invention is that the three dimensional picture could be produced on a modified television screen. Such a screen would have a lined film placed over it and the underlying television image could be a multi-dimensional underlying picture. The claims appended hereto are meant to cover this use of the invention. Also, the invention could be used with different size pictures on the same type of substrate. The different underlying pictures could be taken at different focal lengths or have different types of multi-dimensional picture characteristics. The interfering lines, in the region over each unique underlying picture, could have different thicknesses and spacing to match the unique characteristics of the immediately underlying multi-dimensional picture. This multiple picture, three dimensional page composite is not possible with lenticular lenses since the lens is cast for a single underlying picture. Multiple lenses could not be joined for a single three dimensional page.

The claims appended hereto are meant to cover modifications and changes within the spirit and scope of the present invention.

What is claimed is:

1. A three dimensional, composite picture comprising:

a picture enlarged to a first enlargement size, said picture being formed by a lenticular process prior to enlargement;

a transparent substrate having, on a top surface thereof, periodically spaced non-transparent lines of a predetermined width that are enlarged to said first enlargement size;

said enlarged picture being fixed to a bottom surface of said transparent substrate as an underlying picture.

2. A three dimensional, composite picture as claimed in claim 1 wherein said underlying picture has a plurality of lenticular planes, normal to a picture plane, said non-transparent lines being positioned substantially parallel to said lenticular planes.

3. A three dimensional, composite picture as claimed in claim 2 wherein said underlying picture is opaque to light.

4. A three dimensional, composite picture as claimed in claim 2 wherein said substrate is a flexible plastic.

5. A three dimensional, composite picture as claimed in claim 2 wherein said underlying picture is laminated to said substrate.

6. A three dimensional, composite picture as claimed in claim 2 wherein said substrate and laminated picture are flexible.

7. A three dimensional picture box comprising:

a picture enlarged to a first enlargement size, said picture being formed by a lenticular process prior to enlargement;

a transparent substrate having, on a top surface thereof, periodically spaced non-transparent lines of a predetermined width that are enlarged to said first enlargement size;

said enlarged picture being fixed to a bottom surface of said transparent substrate as an underlying picture;

wherein said underlying picture is translucent to light; and, the picture carrying substrate being mounted in a light emitting plane of a light box.

8. A three dimensional picture box as claimed in claim 7 wherein said underlying picture has a plurality of lenticular planes, normal to a picture plane, said non-transparent lines being positioned substantially parallel to said lenticular planes.

9. A three dimensional picture box as claimed in claim 8 wherein said underlying picture is laminated to said substrate and the resulting laminate is substantially rigid.

10. A three dimensional, composite picture comprising:

a picture enlarged to a first enlargement size, said picture being formed of a multiplicity of vertically spaced, multiple images of an object prior to enlargement;

a transparent substrate having, on a top surface thereof, a multiplicity of periodically spaced non-transparent lines of a predetermined width that are enlarged to said first enlargement size;

said enlarged picture fixed to a bottom surface of said transparent substrate as an underlying picture and said multiplicity of non-transparent lines are substantially aligned with one image of said multiple images.

11. A three dimensional, composite picture as claimed in claim 10 wherein said multiplicity of vertically spaced, multiple images is a multiplicity of vertically spaced serial images, each said serial image consisting of sequential, multiple images of said object, each serial image of said multiplicity being immediately adjacent another serial image.

12. A three dimensional, composite picture as claimed in claim 11 wherein each said line is disposed above similar sequential ones in said multiplicity of serial images.

13. A three dimensional, composite picture as claimed in claim 12 wherein said substrate is generally planar, each said line and corresponding sequential one of said multiplicity of serial images lines in a plane that is substantially normal to the plane of said substrate.

14. A three dimensional, composite picture comprising:

a picture reduced to a first reduction size, said picture being formed by a lenticular process prior to reduction;

a transparent substrate having, on a top surface thereof, periodically spaced non-transparent lines of a predetermined width that are reduced to said first reduction size;

said reduced picture being fixed to a bottom surface of said transparent substrate as an underlying picture.

* * * * *